(12) United States Patent
Delaney (10) Patent No.: US 11,143,223 B2
(45) Date of Patent: Oct. 12, 2021

(54) FASTENER ASSEMBLY FOR NACELLE PRESSURE-RELIEF DOORS

(71) Applicant: ROHR, INC., Chula Vista, CA (US)

(72) Inventor: Mac Patrick Delaney, San Diego, CA (US)

(73) Assignee: Rohr, Inc., Chula Vista, CA (US)

( * ) Notice: Subject to any disclaimer, the term of this patent is extended or adjusted under 35 U.S.C. 154(b) by 206 days.

(21) Appl. No.: 16/429,990

(22) Filed: Jun. 3, 2019

(65) Prior Publication Data

US 2020/0378418 A1 Dec. 3, 2020

(51) Int. Cl.
| | | |
|---|---|---|
| F16B 31/00 | (2006.01) | |
| F16B 37/08 | (2006.01) | |
| B64D 29/06 | (2006.01) | |
| F16B 5/02 | (2006.01) | |

(52) U.S. Cl.
CPC .......... F16B 5/0233 (2013.01); F16B 5/0208 (2013.01); F16B 5/0266 (2013.01)

(58) Field of Classification Search
CPC .... F16B 37/0857; F16B 31/02; F16B 5/0208; F16B 37/0864; B64C 7/02; B64D 29/06
USPC .......................................... 411/433, 390–391
See application file for complete search history.

(56) References Cited

U.S. PATENT DOCUMENTS

| | | | | |
|---|---|---|---|---|
| 2,576,579 A | * | 11/1951 | Donovan | ................ F16B 39/36 411/267 |
| 5,036,770 A | * | 8/1991 | Llewellin | ................ B64G 1/22 102/293 |
| 5,902,085 A | * | 5/1999 | Yuta | ..................... F16B 37/0857 411/433 |
| 6,106,035 A | * | 8/2000 | Hetherington | ............ E05C 5/04 292/251 |
| 6,530,718 B2 | | 3/2003 | Nygren et al. | |
| 6,769,830 B1 | | 8/2004 | Nygren | |
| 7,422,404 B2 | * | 9/2008 | Kitamura | ............ F16B 37/0857 411/268 |
| 7,798,893 B2 | | 9/2010 | Eijkelenberg et al. | |
| 8,136,544 B2 | | 3/2012 | Wilson | |
| 8,246,281 B2 | * | 8/2012 | Gulistan | ............... F16B 5/0208 411/353 |
| 8,919,829 B2 | | 12/2014 | Hernandez | |
| 2013/0256482 A1 | | 10/2013 | Liao | |

FOREIGN PATENT DOCUMENTS

| | | |
|---|---|---|
| DE | 1928490 | 1/1970 |
| DE | 69506249 | 5/1999 |
| EP | 3115562 | 1/2017 |

OTHER PUBLICATIONS

European Patent Office, European Search Report dated Apr. 28, 2020 in Application No. 19216587.6.

* cited by examiner

Primary Examiner — Flemming Saether
(74) Attorney, Agent, or Firm — Snell & Wilmer L.L.P.

(57) ABSTRACT

A fastener assembly may comprise a housing defining a first cavity and a second cavity. A first threaded member and a second threaded member may be located within the housing. A first biasing member may be coupled to the first threaded member. A second biasing member may be coupled to the second threaded member.

18 Claims, 5 Drawing Sheets

FASTENER ASSEMBLY FOR NACELLE PRESSURE-RELIEF DOORS

FIELD

The present disclosure relates to aircraft nacelles, and more particularly to a fastener assembly for nacelle pressure-relief doors.

BACKGROUND

A nacelle for a propulsion system typically includes an inlet, a fan cowl, a thrust reverser, and an exhaust section. The nacelle is typically mounted to a wing or a fuselage of an aircraft via a pylon. The nacelle may provide smooth, aerodynamic surfaces for airflow around and into a gas turbine engine located within the nacelle. Pressurized ducting may be located throughout the nacelle and/or defined by components of the nacelle. Nacelles may include pressure-relief doors configured to open in response to an overloading event, such as a burst duct. The pressure-relief doors need to be able to open to relieve pressure, but also remain securely closed during normal operation.

SUMMARY

A fastener assembly is disclosed herein. In accordance with various embodiments, the fastener assembly may comprise a housing defining a first cavity and a second cavity. A first threaded member may be located within the housing. A second threaded member may be located within the housing. A first biasing member may be coupled to the first threaded member. A second biasing member may be coupled to the second threaded member.

In various embodiments, the first biasing member may apply a first biasing force against the first threaded member in a direction away from the second cavity. The second biasing member may apply a second biasing force against the second threaded member in the direction away from the second cavity.

In various embodiments, a diameter of the first cavity may be less than a diameter of the second cavity. In various embodiments, the fastener assembly may further comprise a fastener configured to engage the first threaded member and the second threaded member.

In various embodiments, the fastener may comprise a collar and a head. The collar and the head may define a groove. In various embodiments, the first biasing member may be oriented at an angle greater than or less than 90° relative to a radially inward surface of the first biasing member.

In various embodiments, the housing may define a first channel extending to from an exterior surface of the housing to the second cavity.

A pressure-relief system is also disclosed herein. In accordance with various embodiments, the pressure-relief system may comprise a pressure-relief door and a fastener assembly configured to secure and release the pressure-relief door. The fastener assembly may comprise a housing defining a first cavity and a second cavity, a first threaded member located within the housing, a second threaded member located within the housing, a first biasing member coupled to the first threaded member, and a second biasing member coupled to the second threaded member.

In various embodiments, a fastener may be coupled to the pressure-relief door. The first threaded member and the second threaded member may be configured to engage the fastener. In various embodiments, the fastener may comprise a collar and a head. The pressure-relief door may be located between the collar and the head.

In various embodiments, the first biasing member may apply a first biasing force against the first threaded member in a direction away from the second cavity. The second biasing member may apply a second biasing force against the second threaded member in the direction away from the second cavity.

In various embodiments, the first biasing member may be oriented at an angle greater than or less than 90° relative to a radially inward surface of the first biasing member. In various embodiments, a diameter of the first cavity may be less than a diameter of the second cavity.

In various embodiments, the second cavity may be located closer to the pressure-relief door as compared to the first cavity. In various embodiments, the housing may define a channel extending from an exterior surface of the housing to the second cavity.

A nacelle is also disclosed herein. In accordance with various embodiments, the nacelle may comprise an exterior panel, a pressure-relief door hingedly coupled to the exterior panel, and a fastener assembly configured to secure and release the pressure-relief door. The fastener assembly may comprise a housing defining a first cavity and a second cavity, a first threaded member located within the housing, a second threaded member located within the housing, a first biasing member coupled to the first threaded member, and a second biasing member coupled to the second threaded member.

In various embodiments, a fastener may be coupled to the pressure-relief door. The first threaded member and the second threaded member may be configured to engage the fastener.

In various embodiments, the first biasing member may apply a first biasing force against the first threaded member in a direction away from the second cavity. The second biasing member may apply a second biasing force against the second threaded member in the direction away from the second cavity.

In various embodiments, a diameter of the first cavity may be less than a diameter of the second cavity. In various embodiments, the nacelle may further comprise at least one of a fan cowl or a thrust reverser. The least one of the fan cowl or the thrust reverser may include the exterior panel.

The foregoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of various embodiments herein makes reference to the accompanying drawings, which show various embodiments by way of illustration. While these various embodiments are described in sufficient detail to enable those skilled in the art to practice the inventions, it should be understood that other embodiments may be realized and that logical, chemical and mechanical changes may be made without departing from the spirit and scope of the inventions. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Surface shading and/or crosshatching lines may be used throughout the figures to denote different parts, but not necessarily to denote the same or different materials. Throughout the present disclosure, like reference numbers denote like elements. Accordingly, elements with like element numbering may be shown in the figures, but may not necessarily be repeated herein for the sake of clarity.

As used herein, "aft" refers to the direction associated with the tail (e.g., the back end) of an aircraft, or generally, to the direction of exhaust of the gas turbine. As used herein, "forward" refers to the direction associated with the nose (e.g., the front end) of an aircraft, or generally, to the direction of flight or motion. As used herein, "a radially outward direction" refers to a direction away from a central longitudinal axis of a nacelle. As used herein, "a radially inward direction" refers to a direction toward from the central longitudinal axis of the nacelle. A first component that is "radially inward" of a second component means that the first component is positioned closer to the central longitudinal axis of the nacelle than the second component. A first component that is "radially outward" of a second component means that the first component is positioned at a greater distance away from a central longitudinal axis of the nacelle. A first component that is "radially inward" of a second component means that the first component is positioned closer to the central longitudinal axis of the nacelle than the second component. The terminology "radially outward" and "radially inward" may also be used relative to reference axes other than the central longitudinal axis of the nacelle.

Fastener assemblies, as described herein, may be configured to secure a pressure-relief door during normal operating conditions and allow the pressure-relief door to open in response to a pressure increase. In accordance with various embodiments, the fastener assembly may include a threaded fastener coupled to the pressure-relief door and configured to engage a set of threaded members. During normal operation, the threaded fastener may engage the threaded members and retain the pressure-relief door in a closed position. During an overloading event, the threaded members may separate and release the fastener, thereby allowing the pressure-relief door to translate to an open position.

Figure 1:
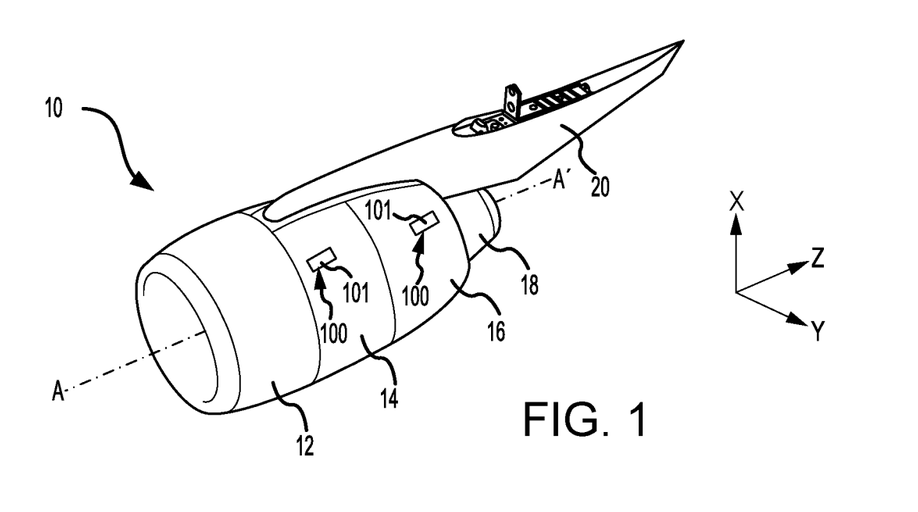
FIG. 1 illustrates a perspective view of a nacelle, in accordance with various embodiments.

Referring to FIG. 1, a nacelle 10 for a propulsion system is illustrated, in accordance with various embodiments. Nacelle 10 may comprise an inlet 12, a fan cowl 14, a thrust reverser 16, and an exhaust system 18. Inlet 12, fan cowl 14, thrust reverser 16, and exhaust system 18 may be position around a central longitudinal axis A-A' of nacelle 10. Nacelle 10 provides smooth aerodynamic surfaces for airflow around and into a gas turbine engine surrounded by nacelle 10. Nacelle 10 may be coupled to a pylon 20. Pylon 20 may be configured to mount nacelle 10 and the gas turbine engine surrounded by nacelle 10 to an aircraft wing or aircraft body.

Nacelle 10 may include one or more pressure-relief systems 100. For example, fan cowl 14 and/or thrust reverser 16 may each include one or more pressure-relief systems 100. Pressure-relief systems 100 each include a pressure-relief door 101. Pressure-relief doors 101 may be hingedly connected. In this regard, pressure-relief doors 101 may pivot, or rotate, between an open position, wherein an interior of nacelle 10 radially inward of the pressure-relief door 101 is exposed and/or accessible, and a closed position, wherein the pressure-relief door 101 contacts and/or forms a sealing interface with the underlying nacelle component (e.g., fan cowl 14 or thrust reverser 16.).

Figure 2A:
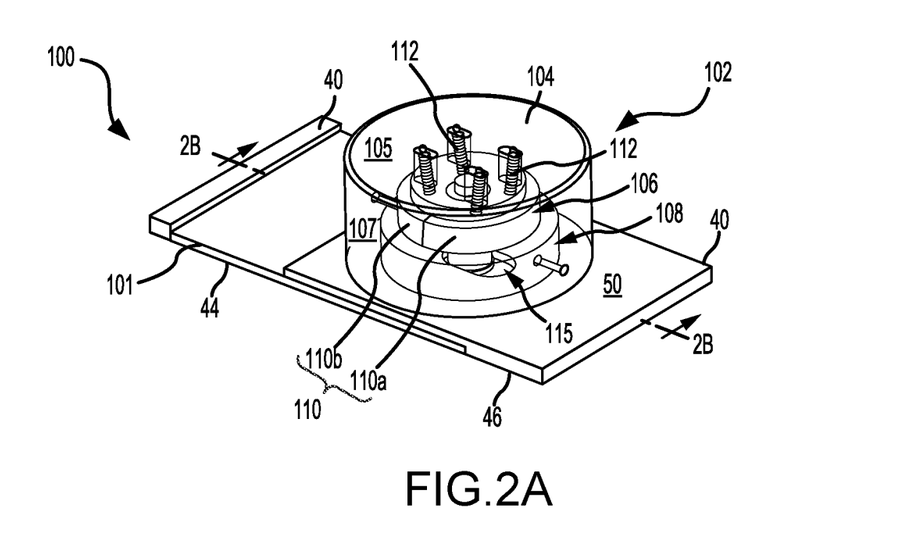
FIG. 2A illustrates a perspective view of a fastener assembly for a pressure-relief system with a pressure-relief door of the system in a closed position, in accordance with various embodiments.
Figure 2B:
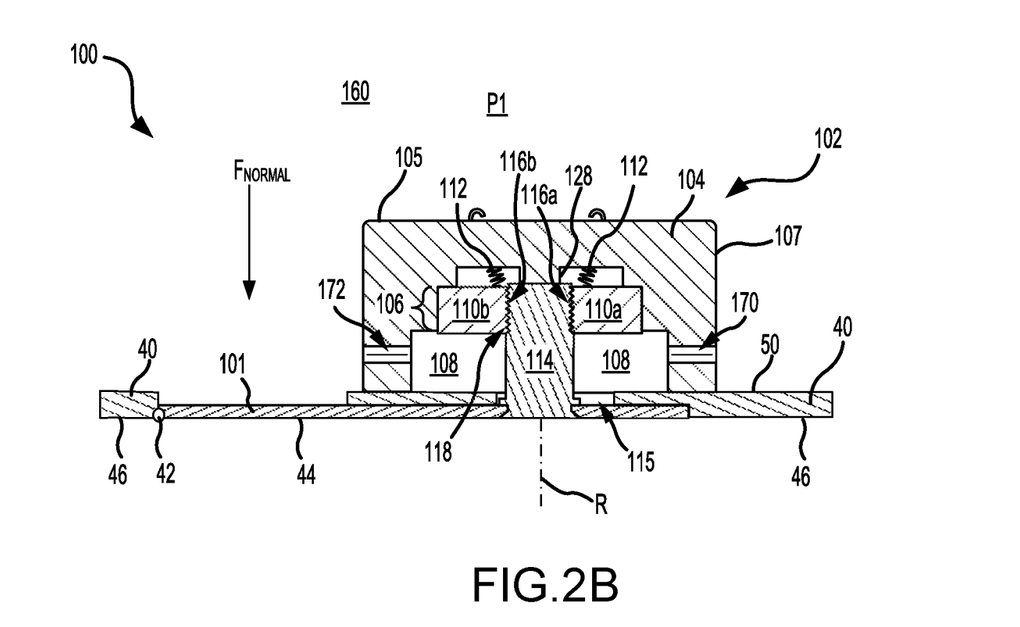
FIG. 2B illustrates a cross-section view, taken along the line 2B-2B in FIG. 2A, of a fastener assembly for a pressure-relief system with a pressure-relief door of the system in a closed position, in accordance with various embodiments.

Referring to FIGS. 2A and 2B, and with continued reference to FIG. 1, a fastener assembly 102 of pressure-relief system 100 is illustrated, in accordance with various embodiments. Pressure-relief system 100 includes fastener assembly 102. Fastener assembly 100 is operably coupled to pressure-relief door 101 of pressure-relief system 100. In this regard, fastener assembly 102 is configured to secure pressure-relief door 101 during normal operating conditions and release pressure-relief door 101 during an overloading event. Pressure-relief door 101 may be hingedly connected to an exterior panel 40 of nacelle 10 via a hinge joint 42. In various embodiments, exterior panel 40 may form a portion of thrust reverser 16. In various embodiments, exterior panel 40 may form a portion of fan cowl 14. It is further contemplated and understood that pressure-relief door 101 and fastener assembly 102 may be located at any location where a pressure-relief door is desired.

In various embodiments, when pressure-relief door 101 is in the closed position, as illustrated in FIGS. 2A and 2B, an exterior (or radially outward) surface 44 of pressure-relief door 101 may be relatively flush or planar with an exterior surface 46 of exterior panel 40. Exterior surfaces 44, 46 are oriented generally away from central longitudinal axis A-A' of nacelle 10. In various embodiments, exterior surface 46 of exterior panel 40 may define an orifice configured to receive pressure-relief door 101. Pressure-relief door 101 may cover the orifice when in the closed position.

In accordance with various embodiments, fastener assembly 102 includes a housing 104. Housing 104 may be coupled to and/or extend from an interior (or radially inward) surface 50 of exterior panel 40. Interior surface 50 is opposite exterior surface 46 and is oriented generally toward central longitudinal axis A-A' of nacelle 10.

In various embodiments, housing 104 may have a generally cylindrical shape. Housing 104 may define a first cavity 106 and a second cavity 108. First cavity 106 is radially inward of second cavity 108. First and second cavities 106, 108 may each comprise a generally cylindrical shape. With momentary reference to FIG. 3, a diameter D1 of first cavity 106 is less than a diameter D2 of second cavity 108.

In accordance with various embodiments, fastener assembly 102 includes a set of threaded members 110, including a first threaded member 110a and a second threaded member 110b. One or more biasing members 112 are coupled each of first threaded member 110a and second threaded member 110b. Biasing members 112 may also be coupled to housing 104. Biasing members 112 are configured to bias first threaded member 110a and second threaded member 110b in a radially inward direction. In this regard, biasing members 112 apply a biasing force against first threaded member 110a and second threaded member 110b in a direction toward a radially inward (or exterior) surface 105 of housing 104 and away from second cavity 108 and pressure-relief door 101. In various embodiments, biasing member 112 may comprise coil springs, each having a central axis C about which the biasing member 112 is coiled.

First threaded member 110a and second threaded member 110b are configured to engage a threaded fastener 114. In this regard, first threaded member 110a and second threaded member 110b each define a threaded surface 116a, 116b, respectively, configured to engage a threaded surface 118 of fastener 114. Fastener 114 is coupled to pressure-relief door 101. Fastener 114 may extend through an orifice 115 defined by exterior panel 40. Orifice 115 may comprise an oval or elliptical shape. The oval shape of orifice 115 may be configured to accommodate a tilting of fastener 114. For example, as pressure-relief door 101 pivots about hinge joint 42, fastener 114 may tilt, such that an angle of an axis of rotation R of fastener 114 relative to interior surface 50 changes. The oval shape of orifice 115 may be configured such that threaded surface 118 will not contact interior surface 50, thereby reducing a likelihood that an interference between fastener 114 and exterior panel 40 will prevent pressure-relief door 101 from translating to an open position.

Figure 3:
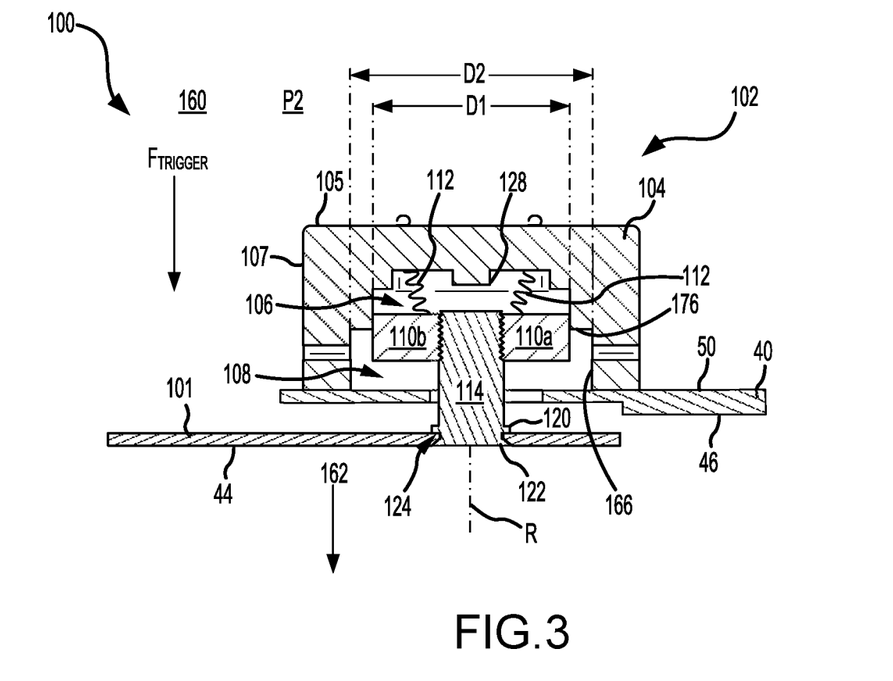
FIG. 3 illustrates a cross-section view of a fastener assembly for a pressure-relief system with a pressure-relief door of the system in a position where the pressure-relief door has begun to open and the fastener assembly is still in a locked state, in accordance with various embodiments.

With momentary reference to FIG. 3, in various embodiments, fastener 114 includes a collar 120 located proximate a head 122 of fastener 114. Collar 120 and head 122 may define a groove 124 configured to receive pressure-relief door 101. Stated differently, a diameter of fastener 114 at groove 124 is less than diameter of fastener 114 at collar 120 and at head 122. In various embodiments, fastener 114 may be coupled to pressure-relief door 101 by locating a portion of pressure-relief door 101 between collar 120 and head 122 of fastener 114.

With reference to FIGS. 2A and 2B and FIG. 3, when fastener assembly 102 is in a locked state, as shown in FIGS. 2A, 2B, and 3, first and second threaded members 110a, 110b engage (i.e., are threaded to) fastener 114. In the locked state, at least, a portion of first and second threaded members 110a, 110b is located in first cavity 106, such that an interference is formed between a wall 130 defining first cavity 106 (with momentary reference to FIG. 4B) and first and second threaded members 110a, 110b. The interference between wall 130 and first and second threaded members 110a, 110b blocks or prevents first and second threaded members 110a, 110b from translating away from fastener 114 in a direction perpendicular to an axis of rotation R of fastener 114 (i.e., from translating in the direction of arrows 132 in FIG. 4). In accordance with various embodiments, diameter D1 of first cavity 106 is selected such that when first and second threaded members 110a, 110b are located in first cavity 106, threaded surfaces 116a, 116b will engage threaded surface 118 of fastener 114.

During normal operating conditions, a pressure P1 within an internal volume 160 defined, at least partially, by exterior panel 40 causes a radially outward force $F_{NORMAL}$ to be applied to pressure-relief door 101. During an overloading event, such as a burst duct, the pressure P2 within an internal volume 160 increases, such that a greater radially outward force $F_{TRIGGER}$ is applied to pressure-relief door 101. In accordance with various embodiments, biasing members 112 are pre-loaded to prevent or reduce radially outward translation of fastener 114 during normal operating loads (i.e., at pressures less than or equal to pressure P1) and to extend in response to an overloading event (i.e., at pressures greater than or equal to pressure P2). In this regard, biasing members 112 are pre-loaded with a force equal to or greater than force $F_{NORMAL}$ and less than force $F_{TRIGGER}$. The pre-load may be established, during installation, by stretching biasing members 112 from the neutral position. The distance each biasing member 112 is stretched (i.e., initially displaced) is based on the spring rate of biasing member 112. Force $F_{TRIGGER}$ exceeding the biasing force applied to pressure-relief door 101 by biasing members 112, causes pressure-relief door 101 and fastener 114, which is attached to pressure-relief door 101, to translate in a radially outward direction and away from housing 104. In the locked position, fastener 114 translates in a radially outward direction and pulls, or translates, first and second threaded members 110a110b in the radially outward direction. Stated differently, when first and second threaded members 110a, 110b are located at least partially within first cavity 106, fastener 114 is engaged with first and second threaded members 110a, 110b, such that radially outward translation of fastener 114 is transferred to first and second threaded members 110a, 110b and causes first and second threaded members 110a, 110b to translate in the radially outward direction.

Figure 4A:
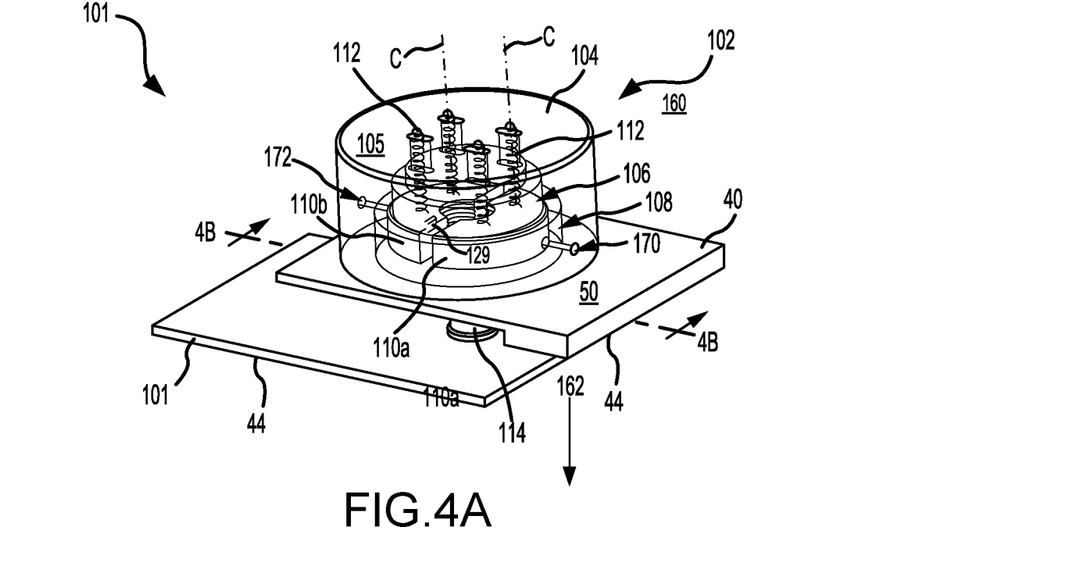
FIG. 4A illustrates a perspective view of a fastener assembly for a pressure-relief system with the fastener assembly in an unlocked state and a pressure-relief door of the system in an open position, in accordance with various embodiments.
Figure 4B:
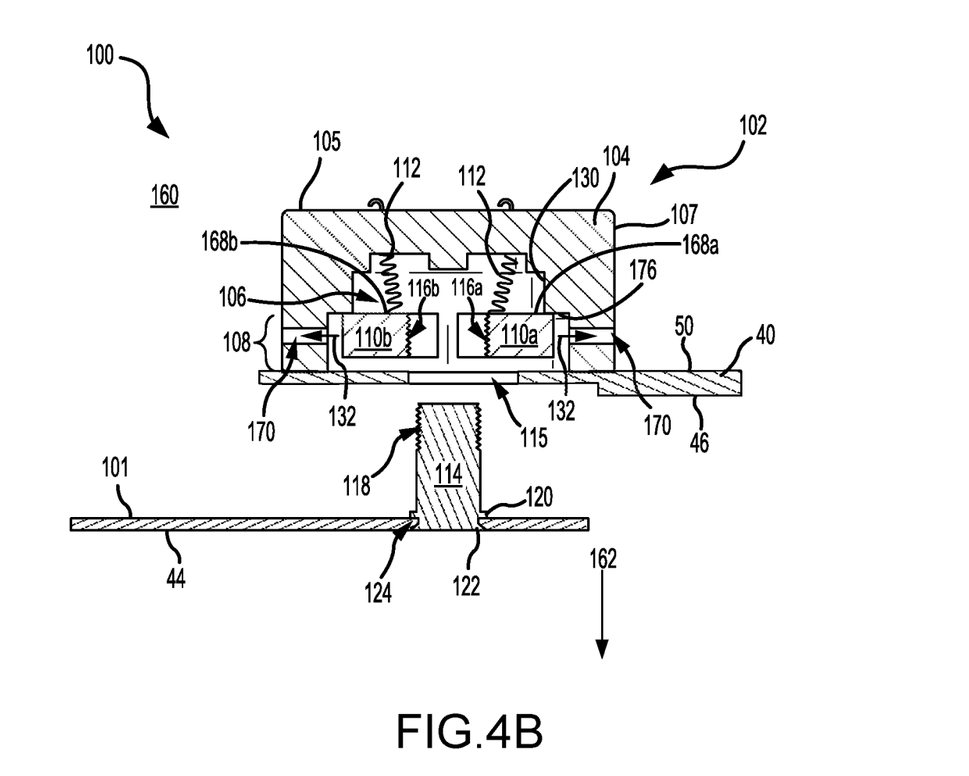
FIG. 4B illustrates a cross-section view, taken along the line 4B-4B in FIG. 4A, of a fastener assembly for a pressure-relief system with the fastener assembly in an unlocked state and a pressure-relief door of the system in an open position, in accordance with various embodiments.

With combined reference to FIG. 3 and FIGS. 4A and 4B, as pressure-relief door 101 translates in the radially outward direction (i.e. in the direction of arrow 162), first and second threaded members 110a, 110b remain engaged with fastener 114 while first and second threaded members 110a, 110b are located at least partially with first cavity 106. When first and second threaded members 110a, 110b translate to a location radially outward of first cavity 106, such that no portion of first and second threaded members 110a, 110b is located with first cavity 106, first and second threaded members 110a, 110b begin to translate away from one another. Stated differently, once the interference between first and second threaded members 110a, 110b and wall 130 of first cavity is removed, first and second threaded members 110a, 110b translate toward a wall 166 of second cavity 108a. Stated yet another way, first threaded member 110a will translate away from axis of rotation R of fastener 114, when a radially inward surface 168a of first threaded member 110a is located radially outward of wall 130 of first cavity 106, and second threaded member 110b will translate away from axis of rotation R of fastener 114, when a radially inward surface 168b of second threaded member 110b is located radially outward of wall 130 of first cavity 106.

As first and second threaded members 110a, 110b translate away from one another, threaded surfaces 116a, 116b disengage from threaded surface 118 of fastener 114, thereby releasing fastener 114 and allowing pressure-relief door 101 to pivot to a fully-open position. In various embodiments, biasing members 112 may be oriented at an angle relative to wall 130 of first cavity, such that the biasing force applied by biasing members 112 works to translate first and second threaded members 110a, 110b toward wall 130. Stated differently, the imaginary center axis C, about which each biasing member 112 is coiled, may be non-parallel to wall 130. Stated yet another way, imaginary center axes C of biasing members 112 may be oriented at an angle that is greater than or less than 90° relative to radially inward surface 168a, 168b of first and second threaded members 110a, 110b.

In various embodiments, housing 104 may define a first channel 170 and a second channel 172. First channel 170 and second channel 172 each extend from an exterior surface 107 of housing 104 to second cavity 108. In various embodiments, exterior surface 107 is approximately normal to radially inward surface 105 of housing 104. As used in the previous context only, "approximately" means±10°. First channel 170 provides an access path to first threaded member 110a, when first threaded member 110a is located in second cavity 108. Second channel 172 provides an access path to second threaded member 102b, when second threaded member 102b is located in second cavity 108. An operator may translate first threaded member 102a and second threaded member 102b towards one another and back to the locked position by inserting a tool (e.g., a screwdriver) through first channel 170 and second channel 172. The tool may push first threaded member 102a and second threaded member 102b towards a center of housing 104. Once the interference between a radially outward surface 176 of housing 104 and radially inward surfaces 168a, 168b of first and second threaded members 102a, 102b is removed, the biasing force of biasing members 112 may cause first and second threaded members 102a, 102b to translate radially inward and into first cavity 106. With first and second threaded members 102a, 102b returned to first cavity 106, the operator may close and secure pressure-relief door 101 by threading fastener 114 into first and second threaded members 102a, 102b.

In various embodiments, housing 104 may include a stop 128. Stop 128 extends in a radially outward direction. Stop 128 is configured is configured to limit radially inward translation of fastener 114 and prevent first and second threaded members 110a from being unintentionally translated radially inward.

In various embodiments, housing 104 may further include a clocking protrusion 129.

Clocking protrusion may extend from wall 130. The clocking protrusion 129 may be configured to form an interreference with first threaded member 110a and/or second threaded member 110b to prevent or reduce rotation of first threaded member 110a and second threaded member 110b about axis R when fastener 114 is installed.

In various embodiments, a plug may be located in first and second channels 170, 172 to prevent fluid and/or or debris from entering housing 104. In various embodiments, first and second channels 170, 172 may be threaded, such that a threaded plug may be inserted in to first and second channels 170, 172.

Figure 5:
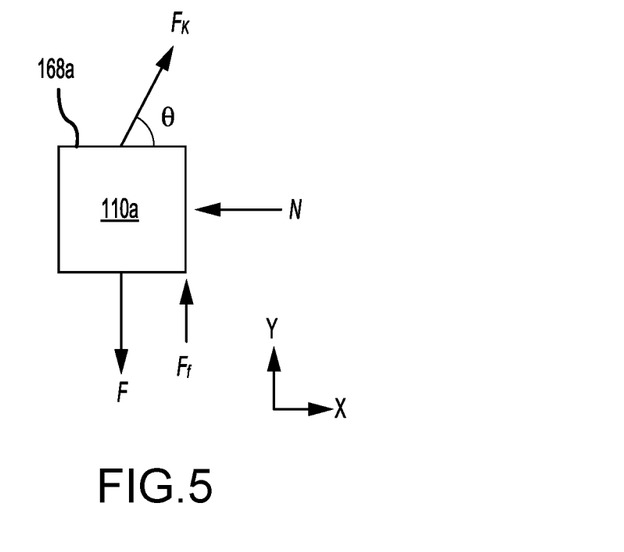
FIG. 5 illustrates forces applied to a threaded member of a fastener assembly, in accordance with various embodiments.

With reference to FIG. 5, and continuing reference to FIGS. 2A, 2B, and FIG. 3, various forces acting on first threaded member 110a are illustrated, in accordance with various embodiments. Force F is the load applied by fastener 114. The load applied by fastener 114 may be determined based on the load experience by pressure-relief door 101, the configuration of hinge joint 42, and the number of fastener assemblies 102 and fasteners 114 per pressure-relief door 101. For example, force F may be 25% of the total load applied to pressure-relief door 101, where pressure-relief door 101 is attached via two hinges and included two fastener assemblies 102 with the load applied evenly over two fasteners 114.

During normal operating conditions, force F may be equal to $F_{NORMAL}$. During an overloading event, force F may be equal to $F_{TRIGGER}$. Spring force $F_k$ is the force applied by the biasing members 112. Housing force N is the normal force applied housing 104. Friction force $F_f$ is the force due to friction between first threaded member 110a and wall 130 of first cavity 106. Spring angle theta (θ) is the angle formed by spring axis C and radially inward surface 168a of first threaded member 110a.

The sum of the forces in the x direction of the provide XY axis may be determined from below equation 1:

$$F_k \cos \theta - N = 0 \qquad \text{EQ. 1}$$

The sum of the forces in they direction of the provide XY axis may be determined from below equation 2:

$$F_k \sin \theta + F_f - F = 0 \qquad \text{EQ. 2}$$

Friction force $F_f$ can be determined from below equation 3:

$$F_f = \mu N = k \delta_o \mu \cos \theta \qquad \text{EQ. 3}$$

Where k is the spring rate of biasing member 112, $\delta_o$ is the initial displacement of the biasing member 112 as measured along axis C of biasing member 112, and μ is the friction constant of housing 104. The initial displacement may determine a desired spring pre-load $F_I$ for biasing members 112 to prevent radially outward translation of first threaded member 110a during normal operating loads (i.e., at pressures less than or equal to pressure P1). At any F below the desired pre-load $F_I$, spring force $F_k$ of biasing member 112 is equal to the product of spring rate k and initial displacement $\delta_o$, as first threaded member 110a will not yet have stretched biasing member 112. The desired spring pre-load $F_I$, can be determined using below equation 4:

$$F_I = k \delta_o \sin \theta + k \delta_o \mu \cos \theta \qquad \text{EQ. 4}$$

The specifications of biasing member 112 may also be selected based on a desired trigger load $F_c$. Desired trigger load $F_c$ represents the load at which fastener 114 will be released. At desired trigger load $F_c$, first and second threaded members 110a, 110b will have translated below first cavity 106 such that first and second threaded members 110a, 110b translate away from fastener 114 and into second cavity 108. Desired trigger load $F_c$ may be determine using below equation 5:

$$F_c = k\delta_f \sin \alpha + k\delta_f \mu \cos \alpha \qquad \text{EQ. 5}$$

Where $\delta_f$ represents the final displacement of biasing member 112 and α represents the angle formed by axis C of biasing member 112 and radially inward surface 168a after displacement of biasing member 112.

The final displacement $\delta_f$ can be determined using below equation 6:

$$\delta_f = \delta_o + L_f - L_o \qquad \text{EQ. 6}$$

Where $L_f$ represents the final length of the biasing member 112 and $L_o$ represents the initial length of the biasing member 112.

Using above equations 4 and 5, spring rate k can be determined using below equation 7:

$$k = \frac{F_l}{\delta_o(\sin \theta + \mu \cos \theta)} = \frac{F_c}{\delta_f(\sin \theta + \mu \cos \theta)} \qquad \text{EQ. 7}$$

Using above equations 4 and 5 and 6, an initial displacement $\delta_o$ of biasing member 112 can be determined using below equation 8:

$$\delta_o = \frac{L_f - L_o}{\frac{F_c(\sin \theta + \mu \cos \theta)}{F_l(\sin \theta + \mu \cos \theta)} - 1} \qquad \text{EQ. 8}$$

Initial displacement $\delta_o$ from equation 8 may be substituted into equation 7 to solve for spring rate k. Spring rate k represents a total spring rate acting on first and second threaded members 110a, 110b, which may be distributed over several biasing members 112. Adjusting the spring rate k and/or initial displacement $\delta_o$ of biasing members 112 allows fastener assembly 102 to be tuned such that pressure-relief door 101 is secured at normal operating loads and released at a trigger load. Stated differently, spring rate k and/or initial displacement $\delta_o$ of biasing members 112 is/are selected such that pressure-relief door 101 remains in the closed position at loads less than a first preselected load (i.e., a trigger load) and translates to the open position at loads greater than the first preselected load (i.e., the trigger load).

Figure 6A:
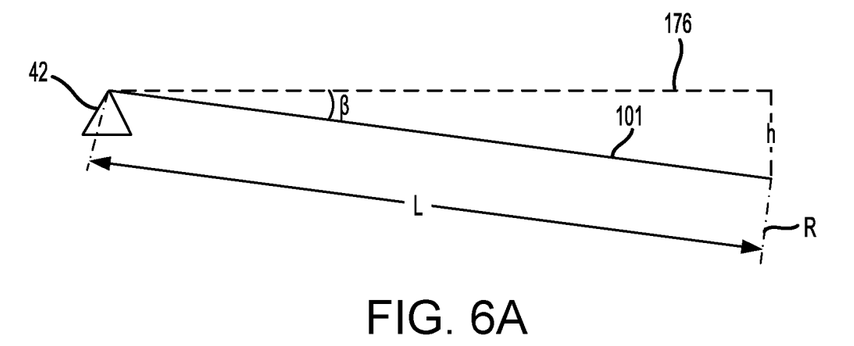
FIGS. 6A and 6B illustrate clearances associated with avoiding fastener assembly jamming, in accordance with various embodiments.
Figure 6B:
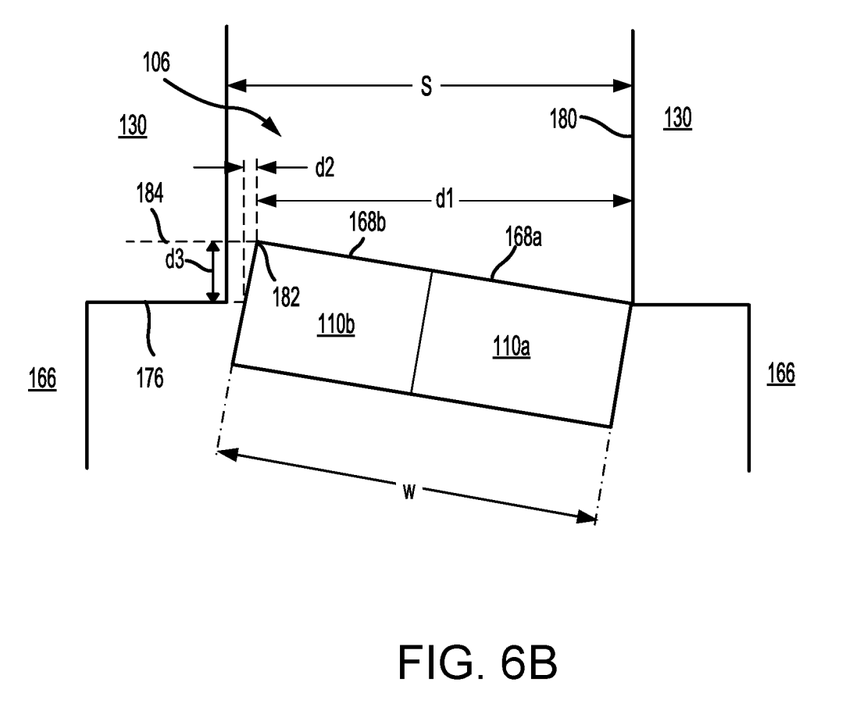

With reference to FIGS. 6A and 6B, clearances associated with avoiding a jamming of first and second threaded members 110a, 110b in first cavity 106 are illustrated, in accordance with various embodiment. The clearance may be configured to avoid opposing sides of first and second threaded members 110a, 110b simultaneously contacting wall 130 of first cavity 106 as pressure-relief door 101 opens and rotates about hinge joint 42.

In FIG. 6A, an angle beta (β) of pressure-relief door 101, relative to a radially outward surface 176 of housing 104 is illustrated. Radially outward surface 176 may extend between wall 130 of first cavity 106, with momentary reference to FIG. 3, and wall 166 of second cavity 108, with momentary reference to FIG. 3. In various embodiments, fastener 114 may release from first and second threaded members 110a, 110b, when pressure-relief door 101 is oriented at angle beta (β). Stated differently, at angle beta (β), radially inward surfaces 168a, 168b of first and second threaded members 110a, 110b may be radially outward of radially outward surface 176. In accordance with various embodiments, angle beta β may be determined using below equation 9:

$$\beta = \sin^{-1}\left(\frac{h}{L}\right) \qquad \text{EQ. 9}$$

Where L is length of pressure-relief door 101 as measured between hinge joint 42 and rotation axis R of fastener 114, and h is the height of first and second threaded members 110a, 110b as measured between radially inward surfaces 168a, 168b of first and second threaded members 110a, 110b and pressure-relief door 101.

In accordance with various embodiments, when pressure-relief door 101 is oriented at angle beta (β), a clearance S associated with avoiding opposing sides of first and second threaded members 110a, 110b simultaneously contacting wall 130 of first cavity 106 is determined based on the sum of a distance d1 and a distance d2. Distance d1 is measured between a surface 180 of wall 130 and an edge 182 of first and second threaded members 110a, 110b. Surface 180 of wall 130 is a surface of wall 130 that is distal, or furthest from, hinge joint 42. Edge 182 is a radially inward edge of first and second threaded members 110a, 110b that is located proximate, or closest, to hinge joint 42. Distance d2 may be calculated based on a distance d3 between radially outward surface 176 of housing 104 and an imaginary axis 184. Imaginary axis 184 is parallel to radially outward surface 176 and extends from radially inward edge 182. In accordance with various embodiment, clearance S may be determined using below equation 10:

$$S = (w \cos \beta) + ((w \sin \beta) * \tan \beta) \qquad \text{EQ. 10}$$

where w is a diameter of first and second threaded members 110a, 110b in the locked position (i.e., in a position where threaded surfaces 116a, 116b engage threaded surface 118 of fastener 114), and angle beta (β) is the angle formed by pressure-relief door 101 and radially outward surface 176 of housing 104.

With combined reference to FIG. 3 and FIG. 6B, in accordance with various embodiments, diameter D1 of first cavity is selected to be greater than clearance S to avoid opposing sides of first and second threaded members 110a, 110b simultaneously contacting wall 130.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure.

The scope of the disclosure is accordingly to be limited by nothing other than the appended claims, in which reference to an element in the singular is not intended to mean "one and only one" unless explicitly so stated, but rather "one or more." It is to be understood that unless specifically stated otherwise, references to "a," "an," and/or "the" may include one or more than one and that reference to an item in the singular may also include the item in the plural. All ranges and ratio limits disclosed herein may be combined.

Moreover, where a phrase similar to "at least one of A, B, and C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A fastener assembly, comprising:
a housing defining a first cavity and a second cavity, wherein a diameter of the first cavity is less than a diameter of the second cavity, and wherein the first cavity is located closer to a radially inward surface of the housing as compared to the second cavity;
a first threaded member located within the housing;
a second threaded member located within the housing;
a first biasing member coupled to the housing and an upper surface of the first threaded member, the upper surface of the first threaded member being oriented toward the radially inward surface of the housing, wherein the first biasing member biases the first threaded member toward to the radially inward surface of the housing and away from the second cavity; and
a second biasing member coupled to the housing and an upper surface of the second threaded member, the upper surface of the second threaded member being oriented toward the radially inward surface of the housing, wherein the second biasing member biases the second threaded member toward to the radially inward surface of the housing and away from the second cavity.

2. The fastener assembly of claim 1, further comprising a fastener configured to engage the first threaded member and the second threaded member.

3. The fastener assembly of claim 2, wherein the fastener comprises a collar and a head, the second cavity being located closer to the head of the fastener as compared to the first cavity, and wherein the collar and the head define a groove.

4. The fastener assembly of claim 1, wherein a first center axis about which the first biasing member is coiled is oriented at an angle greater than or less than 90° relative to the radially inward surface of the housing.

5. The fastener assembly of claim 1, wherein the housing defines a first channel extending to from an exterior surface of the housing to the second cavity.

6. The fastener assembly of claim 1, wherein the housing comprises:
a first wall defining the first cavity, wherein the diameter of the first cavity is measured at the first wall;
a second wall defining the second cavity, wherein the diameter of the second cavity is measured at the second wall; and
a radially outward surface extending between the first wall and the second wall, and wherein the first biasing member applies a first biasing force to the first threaded member in a first direction, the first direction being non-parallel to the first wall, and wherein the second biasing member applies a second biasing force to the second threaded member in a second direction, the second direction being non-parallel to the first wall.

7. A pressure-relief system, comprising:
a pressure-relief door; and
a fastener assembly configured to secure and release the pressure-relief door, the fastener assembly comprising:
a housing defining a first cavity and a second cavity, wherein a diameter of the first cavity is less than a diameter of the second cavity, and wherein the second cavity is located closer to the pressure-relief door as compared to the first cavity;
a first threaded member located within the housing;
a second threaded member located within the housing;
a first biasing member coupled to the first threaded member; and
a second biasing member coupled to the second threaded member.

8. The pressure-relief system of claim 7, further comprising a fastener coupled to the pressure-relief door, wherein the first threaded member and the second threaded member are configured to engage the fastener.

9. The pressure-relief system of claim 8, wherein the fastener comprises a collar and a head, and wherein the pressure-relief door is located between the collar and the head.

10. The pressure-relief system of claim 9, wherein the housing defines a channel extending from an exterior surface of the housing to the second cavity.

11. The pressure-relief system of claim 7, wherein the first biasing member applies a first biasing force against the first threaded member in a direction away from the second cavity, and wherein the second biasing member applies a second biasing force against the second threaded member in the direction away from the second cavity.

12. The pressure-relief system of claim 11, wherein a first center axis about which the first biasing member is coiled is oriented at an angle greater than or less than 90° relative to a radially inward surface of the housing.

13. The pressure-relief system of claim 7, wherein the housing comprises:
a first wall defining the first cavity, wherein the diameter of the first cavity is measured at the first wall;

a second wall defining the second cavity, wherein the diameter of the second cavity is measured at the second wall; and a radially outward surface extending between the first wall and the second wall, and wherein the first biasing member applies a first biasing force to the first threaded member in a first direction, the first direction being non-parallel to the first wall, and wherein the second biasing member applies a second biasing force to the second threaded member in a second direction, the second direction being non-parallel to the first wall.

14. A nacelle, comprising:

an exterior panel;

a pressure-relief door hingedly coupled to the exterior panel; and a fastener assembly configured to secure and release the pressure-relief door, the fastener assembly comprising:

a housing defining a first cavity and a second cavity, wherein a diameter of the first cavity is less than a diameter of the second cavity, and wherein the second cavity is located closer to the pressure-relief door as compared to the first cavity;

a first threaded member located within the housing;

a second threaded member located within the housing;

a first biasing member coupled to the first threaded member; and a second biasing member coupled to the second threaded member.

15. The nacelle of claim 14, further comprising a fastener coupled to the pressure-relief door, wherein the first threaded member and the second threaded member are configured to engage the fastener.

16. The nacelle of claim 14, wherein the first biasing member applies a first biasing force against the first threaded member in a direction away from the second cavity, and wherein the second biasing member applies a second biasing force against the second threaded member in the direction away from the second cavity.

17. The nacelle of claim 14, wherein the housing comprises:

a first wall defining the first cavity, wherein the diameter of the first cavity is measured at the first wall;

a second wall defining the second cavity, wherein the less than a diameter of the second cavity is measured at the second wall; and a radially outward surface extending between the first wall and the second wall, and wherein a first center axis about which the first biasing member is coiled and a second center axis about which the second biasing member is coiled are each non-parallel to the first wall.

18. The nacelle of claim 14, further comprising at least one of a fan cowl or a thrust reverser, wherein the least one of the fan cowl or the thrust reverser includes the exterior panel.

* * * * *